(12) United States Patent
Du et al.

(10) Patent No.: US 10,908,492 B2
(45) Date of Patent: Feb. 2, 2021

(54) IMAGE PROCESSING METHOD AND APPARATUS, AND ELECTRONIC DEVICE

(71) Applicant: Huawei Technologies Co., Ltd., Guangdong (CN)

(72) Inventors: Cheng Du, Beijing (CN); Wei Luo, Shanghai (CN); Bin Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 15/507,190

(22) PCT Filed: Aug. 29, 2014

(86) PCT No.: PCT/CN2014/085608
§ 371 (c)(1),
(2) Date: Feb. 27, 2017

(87) PCT Pub. No.: WO2016/029465
PCT Pub. Date: Mar. 3, 2016

(65) Prior Publication Data
US 2018/0231885 A1    Aug. 16, 2018

(51) Int. Cl.
*G03B 35/08* (2006.01)
*H04N 5/225* (2006.01)
(Continued)

(52) U.S. Cl.
CPC ........... *G03B 35/08* (2013.01); *H04N 5/2258* (2013.01); *H04N 5/232* (2013.01); *H04N 5/2355* (2013.01);
(Continued)

(58) Field of Classification Search
CPC . H04N 5/23216; H04N 5/2355; H04N 13/239
See application file for complete search history.

(56) References Cited

U.S. PATENT DOCUMENTS

| 5,027,817 A * | 7/1991 | John | G01T 1/1647 |
| | | | 250/363.03 |
| 6,215,892 B1 * | 4/2001 | Douglass | G01N 1/312 |
| | | | 382/128 |

(Continued)

FOREIGN PATENT DOCUMENTS

| CN | 101997981 A | 3/2011 |
| CN | 102036013 A | 4/2011 |

(Continued)

*Primary Examiner* — Joshua D Taylor
(74) *Attorney, Agent, or Firm* — Kilpatrick Townsend & Stockton LLP (57) ABSTRACT

This application provides an image processing method and an electronic device. The method includes: obtaining a first image and a second image that are acquired at a same acquisition moment, where the first image is obtained by using a first photographing unit to acquire an image in a first acquisition region, and the second image is obtained by using a second photographing unit to acquire an image in a second acquisition region, where a parameter of the first photographing unit and a parameter of the second photographing unit are the same, and there is an overlapping acquisition region between the first acquisition region and the second acquisition region; and determining, according to the first image and the second image, whether the first photographing unit and the second photographing unit are normal.

18 Claims, 5 Drawing Sheets

(51) Int. Cl.
*H04N 5/232* (2006.01)
*H04N 5/247* (2006.01)
*H04N 5/235* (2006.01)
*H04N 13/204* (2018.01)
*H04N 17/00* (2006.01)
*H04N 13/00* (2018.01)

(52) U.S. Cl.
CPC ......... *H04N 5/23229* (2013.01); *H04N 5/247* (2013.01); *H04N 13/204* (2018.05); *H04N 17/002* (2013.01); *H04N 2013/0074* (2013.01)

(56) References Cited

U.S. PATENT DOCUMENTS

| | | | |
|---|---|---|---|
| 8,488,041 | B2 | 6/2013 | Nakajima et al. |
| 2004/0012682 | A1 | 1/2004 | Kosaka et al. |
| 2011/0080494 | A1 | 4/2011 | Mori et al. |
| 2011/0187886 | A1* | 8/2011 | Nakajima ............... H04N 5/228 348/222.1 |
| 2012/0013708 | A1 | 1/2012 | Okubo |
| 2012/0162366 | A1* | 6/2012 | Ninan .................. H04N 5/2355 348/43 |
| 2013/0021447 | A1 | 1/2013 | Brisedoux et al. |
| 2013/0128072 | A1 | 5/2013 | Kobayashi |
| 2013/0314404 | A1* | 11/2013 | Jachalsky ............. G06T 7/0002 345/419 |
| 2014/0085423 | A1* | 3/2014 | Lee ...................... H04N 13/239 348/46 |
| 2014/0368688 | A1* | 12/2014 | John Archibald ........................... H04N 5/23241 348/222.1 |
| 2015/0319373 | A1* | 11/2015 | Shukla ............... H04N 5/23216 348/241 |
| 2016/0307300 | A1 | 10/2016 | Chen et al. |

FOREIGN PATENT DOCUMENTS

| | | |
|---|---|---|
| CN | 102156380 A | 8/2011 |
| CN | 102340631 A | 2/2012 |
| CN | 103081483 A | 5/2013 |
| CN | 103685951 A | 3/2014 |
| JP | 2004040712 A | 2/2004 |
| JP | 2010114760 A | 5/2010 |
| JP | 2010154311 A | 7/2010 |
| KR | 10-1428635 B1 | 8/2014 |

* cited by examiner

IMAGE PROCESSING METHOD AND APPARATUS, AND ELECTRONIC DEVICE

CROSS REFERENCE TO RELATED APPLICATIONS

The present application claims priority under 35 U.S.C. § 365 to International Patent Application No. PCT/CN2014/085608 filed Aug. 29, 2014 which is hereby incorporated by reference in its entirety.

TECHNICAL FIELD

This application relates to the field of electronic technologies, and in particular, to an image processing method and apparatus, and an electronic device.

BACKGROUND

With development of electronic technologies, electronic devices such as a smart phone, a feature phone, and a tablet computer have provided a photographing function. Some electronic devices are provided with one photographing unit, and some electronic devices are provided with two photographing units. For example, a mobile phone is provided with a front-facing camera and a rear-facing camera.

However, during a process of using an electronic device by a user, a photographing unit may become abnormal for various reasons. For example, there is a blurry area on a lens, or a lens is partially blocked during a process of photographing. All the foregoing abnormalities lead to a poor photographing effect. However, in the prior art, there is no solution to determining whether the photographing unit is normal.

SUMMARY

Embodiments of this application provide an image processing method and apparatus, and an electronic device, so as to resolve a technical problem in the prior art that there is no solution to determining whether a photographing unit is normal.

A first aspect of this application provides an image processing method, including:
  obtaining a first image and a second image that are acquired at a same acquisition moment, where the first image is obtained by using a first photographing unit to acquire an image in a first acquisition region, and the second image is obtained by using a second photographing unit to acquire an image in a second acquisition region, where a parameter of the first photographing unit and a parameter of the second photographing unit are the same, and there is an overlapping acquisition region between the first acquisition region and the second acquisition region; and
  determining, according to the first image and the second image, whether the first photographing unit and the second photographing unit are normal.

With reference to the first aspect, in a first possible implementation manner of the first aspect, when it is determined that the first photographing unit and the second photographing unit are normal, two frames of images in the two acquisition regions that have an overlapping acquisition region and that are acquired by the first photographing unit and the second photographing unit at the same acquisition moment are synthesized to form a high dynamic range HDR image.

With reference to the first aspect or the first possible implementation manner of the first aspect, in a second possible implementation manner of the first aspect, the determining, according to the first image and the second image, whether the first photographing unit and the second photographing unit are normal includes: obtaining an offset between the first image and the second image; shifting the first image according to the offset; separately dividing the shifted first image and the second image into n*m block regions, where n and m are both positive integers greater than 1; determining a case in which block regions on corresponding positions on the shifted first image and the second image do not match each other; and determining, based on the case of mutual mismatch, whether the first photographing unit and the second photographing unit are normal.

With reference to the second possible implementation manner of the first aspect, in a third possible implementation manner of the first aspect, the method further includes:
  obtaining a similarity between the first image and the second image; and
  the determining, based on the case of mutual mismatch, whether the first photographing unit and the second photographing unit are normal includes:
  determining, based on the case of mutual mismatch and the similarity, whether the first photographing unit and the second photographing unit are normal.

With reference to the third possible implementation manner of the first aspect, in a fourth possible implementation manner of the first aspect, the obtaining a similarity between the first image and the second image includes:
  obtaining an image mean difference between the first image and the second image and/or an image variance difference between the first image and the second image, and using the image mean difference and/or the image variance difference as the similarity; and
  the determining, based on the case of mutual mismatch and the similarity, whether the first photographing unit and the second photographing unit are normal includes:
  when the image mean difference is greater than a first threshold and/or the image variance difference is greater than a second threshold, and a proportion of the block regions, on the corresponding positions, that do not match each other is greater than the first threshold, determining that a lens of at least one of the first photographing unit and the second photographing unit is blocked.

With reference to the second possible implementation manner of the first aspect, in a fifth possible implementation manner of the first aspect, the determining, based on the case of mutual mismatch, whether the first photographing unit and the second photographing unit are normal includes:
  determining, based on the case of mutual mismatch and the offset, whether the first photographing unit and the second photographing unit are normal.

With reference to the fifth possible implementation manner of the first aspect, in a sixth possible implementation manner of the first aspect, the determining, based on the case of mutual mismatch and the offset, whether the first photographing unit and the second photographing unit are normal includes:
  when the offset is greater than a second threshold, and a proportion of the block regions that do not match each other is less than a third threshold, determining that a relationship between relative positions of the first photographing unit and the second photographing unit is abnormal.

With reference to the second possible implementation manner of the first aspect, in a seventh possible implementation manner of the first aspect, the method further includes:

calculating a similarity between the first image and the second image; and the determining, based on the case of mutual mismatch, whether the first photographing unit and the second photographing unit are normal includes:

determining, based on the similarity, the offset, and the case of mismatch, whether the first photographing unit and the second photographing unit are normal.

With reference to the second possible implementation manner of the first aspect, in an eighth possible implementation manner of the first aspect, the determining, based on the case of mutual mismatch, whether the first photographing unit and the second photographing unit are normal includes:

when positions of block regions that are consecutively mismatched are the same, determining that a lens of at least one of the first photographing unit and the second photographing unit has a blurry area.

With reference to the first aspect or the first possible implementation manner of the first aspect, in a ninth possible implementation manner of the first aspect, the determining, according to the first image and the second image, whether the first photographing unit and the second photographing unit are normal includes:

determining, according to the offset between the first image and the second image and/or the similarity between the first image and the second image, whether the first photographing unit and the second photographing unit are normal.

With reference to the first aspect or any one of the first possible implementation manner to the ninth possible implementation manner of the first aspect, in a tenth possible implementation manner of the first aspect, before the determining, according to the first image and the second image, whether the first photographing unit and the second photographing unit are normal, the method further includes:

determining that a current scenario in which the first photographing unit and the second photographing unit are is an HDR scenario.

With reference to the first possible implementation manner of the first aspect, in an eleventh possible implementation manner of the first aspect, when it is determined that the first photographing unit and the second photographing unit are normal, the method further includes:

separately calculating depth information of each object in the first image and the second image; and determining that a quantity of objects whose depth information is greater than a threshold exceeds a preset value.

A second aspect of this application provides an image processing apparatus, including:

an obtaining unit, configured to obtain a first image and a second image that are acquired at a same acquisition moment, where the first image is obtained by using a first photographing unit to acquire an image in a first acquisition region, and the second image is obtained by using a second photographing unit to acquire an image in a second acquisition region, where a parameter of the first photographing unit and a parameter of the second photographing unit are the same, and there is an overlapping acquisition region between the first acquisition region and the second acquisition region; and a determining unit, configured to determine, according to the first image and the second image, whether the first photographing unit and the second photographing unit are normal.

With reference to the second aspect, in a first possible implementation manner of the second aspect, the apparatus further includes a processing unit, configured to: when it is determined that the first photographing unit and the second photographing unit are normal, synthesize two frames of images in the two acquisition regions that have an overlapping acquisition region and that are acquired by the first photographing unit and the second photographing unit at the same acquisition moment to form a high dynamic range HDR image.

With reference to the second aspect or the first possible implementation manner of the second aspect, in a second possible implementation manner of the second aspect, the determining unit is specifically configured to: obtain an offset between the first image and the second image; shift the first image according to the offset; separately divide the shifted first image and the second image into n*m block regions, where n and m are positive integers greater than 1; determine a case in which block regions on corresponding positions on the shifted first image and the second image do not match each other; and determine, based on the case of mutual mismatch, whether the first photographing unit and the second photographing unit are normal.

With reference to the second possible implementation manner of the second aspect, in a third possible implementation manner of the second aspect, the determining unit is further configured to: obtain a similarity between the first image and the second image; and determine, based on the case of mutual mismatch and the similarity, whether the first photographing unit and the second photographing unit are normal.

With reference to the third possible implementation manner of the second aspect, in a fourth possible implementation manner of the second aspect, the determining unit is specifically configured to: obtain an image mean difference between the first image and the second image and/or an image variance difference between the first image and the second image, and use the image mean difference and/or the image variance difference as the similarity; and when the image mean difference is greater than a first threshold and/or the image variance difference is greater than a second threshold, and a proportion of the block regions, on the corresponding positions, that do not match each other is greater than the first threshold, determine that a lens of at least one of the first photographing unit and the second photographing unit is blocked.

With reference to the second possible implementation manner of the second aspect, in a fifth possible implementation manner of the second aspect, the determining unit is specifically configured to: determine, based on the case of mutual mismatch and the offset, whether the first photographing unit and the second photographing unit are normal.

With reference to the fifth possible implementation manner of the second aspect, in a sixth possible implementation manner of the second aspect, the determining unit is specifically configured to: when the offset is greater than a second threshold, and a proportion of the block regions that do not match each other is less than a third threshold, determine that a relationship between relative positions of the first photographing unit and the second photographing unit is abnormal.

With reference to the second possible implementation manner of the second aspect, in a seventh possible implementation manner of the second aspect, the determining unit is further configured to: calculate a similarity between the first image and the second image; and determine, based on the similarity, the offset, and the case of mismatch, whether the first photographing unit and the second photographing unit are normal.

With reference to the second possible implementation manner of the second aspect, in an eighth possible implementation manner of the second aspect, the determining unit is specifically configured to: when positions of block regions that are consecutively mismatched are the same, determine that a lens of at least one of the first photographing unit and the second photographing unit has a blurry area.

With reference to the second aspect or the first possible implementation manner of the second aspect, in a ninth possible implementation manner of the second aspect, the determining unit is specifically configured to: determine, according to the offset between the first image and the second image and/or the similarity between the first image and the second image, whether the first photographing unit and the second photographing unit are normal.

With reference to the second aspect or any one of the first possible implementation manner of the second aspect to the ninth possible implementation manner of the second aspect, in a tenth possible implementation manner of the second aspect, the determining unit is further configured to: before the determining, according to the first image and the second image, whether the first photographing unit and the second photographing unit are normal, determine a current scenario in which the first photographing unit and the second photographing unit are is an HDR scenario.

With reference to the first possible implementation manner of the second aspect, in an eleventh possible implementation manner of the second aspect, the determining unit is further configured to: when it is determined that the first photographing unit and the second photographing unit are normal, separately calculate depth information of each object in the first image and the second image; and determine that a quantity of objects whose depth information is greater than a threshold exceeds a preset value.

A third aspect of this application provides an electronic device, including:
  a first photographing unit, configured to acquire an image in a first acquisition region so as to obtain a first image;
  a second photographing unit, configured to acquire, at the same acquisition moment at which the first image is acquired, an image in a second acquisition region so as to obtain a second image, where a parameter of the first photographing unit and a parameter of the second photographing unit are the same, and there is an overlapping acquisition region between the first acquisition region and the second acquisition region; and
  a processor, configured to determine, according to the first image and the second image, whether the first photographing unit and the second photographing unit are normal.

With reference to the third aspect, in a first possible implementation manner of the third aspect, the processor is further configured to: when it is determined that the first photographing unit and the second photographing unit are normal, synthesize two frames of images in the two acquisition regions that have an overlapping acquisition region and that are acquired by the first photographing unit and the second photographing unit at the same acquisition moment to form a high dynamic range HDR image.

With reference to the third aspect or the first possible implementation manner of the third aspect, in a second possible implementation manner of the third aspect, the processor is specifically configured to: obtain an offset between the first image and the second image; shift the first image according to the offset; separately divide the shifted first image and the second image into n*m block regions, where n and m are positive integers greater than 1; determine a case in which block regions on corresponding positions on the shifted first image and the second image do not match each other; and determine, based on the case of mutual mismatch, whether the first photographing unit and the second photographing unit are normal.

With reference to the second possible implementation manner of the third aspect, in a third possible implementation manner of the third aspect, the processor is further configured to: obtain a similarity between the first image and the second image; and determine, based on the case of mutual mismatch and the similarity, whether the first photographing unit and the second photographing unit are normal.

With reference to the third possible implementation manner of the third aspect, in a fourth possible implementation manner of the third aspect, the processor is specifically configured to: obtain an image mean difference between the first image and the second image and/or an image variance difference between the first image and the second image, and use the image mean difference and/or the image variance difference as the similarity; and
  when the image mean difference is greater than a first threshold and/or the image variance difference is greater than a second threshold, and a proportion of the block regions, on the corresponding positions, that do not match each other is greater than the first threshold, determine that a lens of at least one of the first photographing unit and the second photographing unit is blocked.

With reference to the second possible implementation manner of the third aspect, in a fifth possible implementation manner of the third aspect, the processor is specifically configured to: determine, based on the case of mutual mismatch and the offset, whether the first photographing unit and the second photographing unit are normal.

With reference to the fifth possible implementation manner of the third aspect, in a sixth possible implementation manner of the third aspect, the processor is specifically configured to: when the offset is greater than a second threshold, and a proportion of the block regions that do not match each other is less than a third threshold, determine that a relationship between relative positions of the first photographing unit and the second photographing unit is abnormal.

With reference to the second possible implementation manner of the third aspect, in a seventh possible implementation manner of the third aspect, the processor is further configured to: calculate a similarity between the first image and the second image; and determine, based on the similarity, the offset, and the case of mismatch, whether the first photographing unit and the second photographing unit are normal.

With reference to the second possible implementation manner of the third aspect, in an eighth possible implementation manner of the third aspect, the processor is specifically configured to: when positions of block regions that are consecutively mismatched are the same, determine that a lens of at least one of the first photographing unit and the second photographing unit has a blurry area.

With reference to the third aspect or the first possible implementation manner of the third aspect, in a ninth possible implementation manner of the third aspect, the processor is specifically configured to: determine, according to the offset between the first image and the second image and/or the similarity between the first image and the second image, whether the first photographing unit and the second photographing unit are normal.

With reference to the third aspect or any one of the first possible implementation manner of the third aspect to the ninth possible implementation manner of the third aspect, in a tenth possible implementation manner of the third aspect, and in the third possible implementation manner of the third aspect, the processor is further configured to: before the determining, according to the first image and the second image, whether the first photographing unit and the second photographing unit are normal, determine a current scenario in which the first photographing unit and the second photographing unit are is an HDR scenario.

With reference to the first possible implementation manner of the third aspect, in an eleventh possible implementation manner of the third aspect, the processor is further configured to: when it is determined that the first photographing unit and the second photographing unit are normal, separately calculate depth information of each object in the first image and the second image; and determine that a quantity of objects whose depth information is greater than a threshold exceeds a preset value.

One or more technical solutions provided in the embodiments of this application have at least the following technical effects or advantages:

In the embodiments of this application, whether a first photographing unit and a second photographing unit are normal is determined according to a first image and a second image, where the first image is obtained by using the first photographing unit to acquire an image in a first acquisition region and the second image is obtained by using the second photographing unit to acquire an image in a second acquisition region; there is an overlapping acquisition region between the first acquisition region and the second acquisition region. It may be learned that, in the embodiments of this application, an electronic device may determine, according to the images photographed by two photographing units, whether the two photographing units are normal. That is, the embodiments of this application provide a method for determining whether the photographing unit is normal, so as to photograph an image under the circumstance that both the photographing units are normal, and guarantee a photographing effect.

DETAILED DESCRIPTION

Embodiments of this application provide an image processing method and apparatus, and an electronic device, so as to resolve a technical problem in the prior art that there is no solution to determining whether a photographing unit is normal.

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

Figure 1:
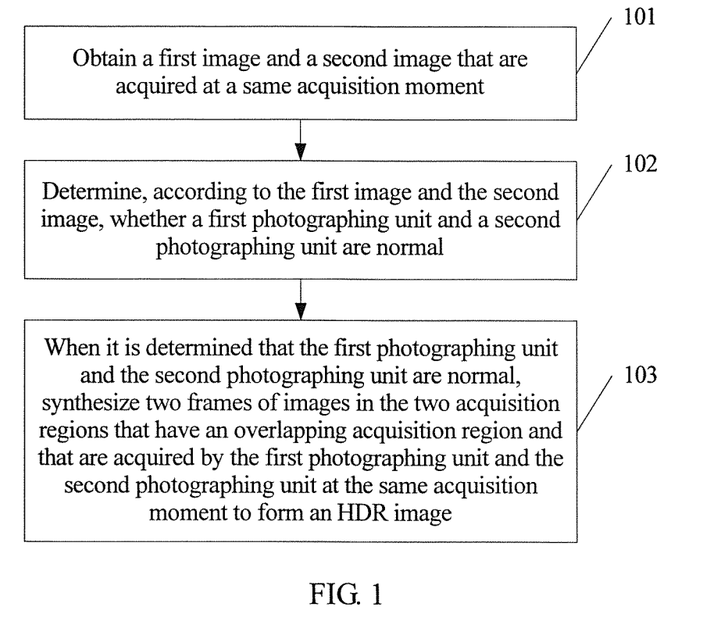
FIG. 1 is a flowchart of an image processing method according to an embodiment of this application.

First, an implementation process of an image processing method in an embodiment of this application is described. Referring to FIG. 1, FIG. 1 is a flowchart of the image processing method in this embodiment. The method includes the following content:

A step indicated by a reference numeral 101 is: obtaining a first image and a second image that are acquired at a same acquisition moment, where the first image is obtained by using a first photographing unit to acquire an image in a first acquisition region, and the second image is obtained by using a second photographing unit to acquire an image in a second acquisition region, where a parameter of the first photographing unit and a parameter of the second photographing unit are the same, and there is an overlapping acquisition region between the first acquisition region and the second acquisition region.

The first photographing unit and the second photographing unit are disposed on one electronic device. For example, the electronic device is a mobile phone, a tablet computer, or a camera.

Optionally, a first lens of the first photographing unit and a second lens of the second photographing unit are disposed on a same side of the electronic device. Preferably, the first lens and the second lens are disposed on a same plane of the electronic device, for example, both are disposed on a rear housing of a mobile phone.

Optionally, the first lens may be a front-facing lens, and the second lens may be a rear-facing lens. In use, one lens of the two may be flipped to another side where another lens is disposed.

Preferably, when the image is being obtained, an optical axis of the first photographing unit and an optical axis of the second photographing unit are parallel to ensure that a motion between the first image and the second image is a translational motion, so that a computational amount for rectification is low.

Further, the parameter of the first photographing unit and the parameter of the second photographing unit are the same, for example, the first photographing unit and the second photographing unit have a same focal length. It may be understood that the first photographing unit and the second photographing unit may have a same focal length and a same image sensor; certainly, the first photographing unit and the second photographing unit may have a same lens and another same hardware parameter.

It should be noted that: that the first photographing unit and the second photographing unit have one same parameter may be understood that the parameter of the first photographing unit and the parameter of the second photographing unit are the same; certainly, that the first photographing unit and the second photographing unit have multiple same parameters (for example, two parameters or three parameters are the same) may also be understood that the parameter of the first photographing unit and the parameter of the second photographing unit are the same. Preferably, all the parameters of the first photographing unit and the second photographing unit are the same, that is, the first photographing unit and the second photographing unit are two same photographing units.

Figure 2:
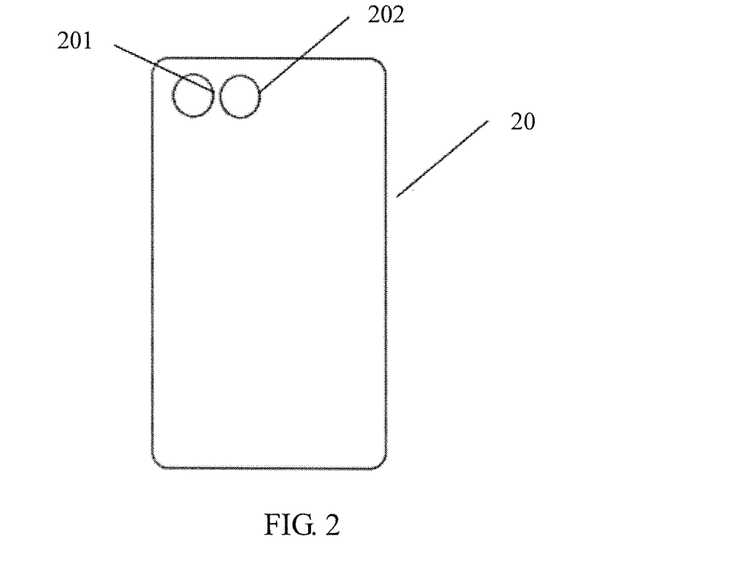
FIG. 2 is a schematic diagram of disposing of a lens of a photographing unit according to an embodiment of this application.

Referring to FIG. 2, FIG. 2 is a possible schematic diagram of disposing of a first photographing unit 201 and a second photographing unit 202 on an electronic device 20. The first photographing unit 201 and the second photographing unit 202 are disposed on a same side of an electronic device, for example, the first photographing unit 201 and the second photographing unit 202 are disposed on the side of a rear housing of the electronic device.

When photographing, a handheld electronic device 20 photographs a first image by using the first photographing unit 201 and photographs, at the same time, a second image by using the second photographing unit 202. Although the first photographing unit 201 and the second photographing unit 202 perform photographing for a same acquisition region, there is some distance in a horizontal direction between an optical axis of the first photographing unit 201 and an optical axis of the second photographing unit 202, so that a first acquisition region of the first photographing unit 201 and a second acquisition region of the second photographing unit 202 are not completely the same, but there is an overlapping acquisition region between the first acquisition region and the second acquisition region.

Optionally, the electronic device used to photograph the first image and the second image and an electronic device used to execute a step indicated by a reference numeral 102 may be a same electronic device. Specifically, the electronic device obtains image signals, by using an image sensor like a charge-coupled device (English: Charge-coupled Device, CCD for short) or a complementary metal oxide semiconductor (English: Complementary Metal Oxide Semiconductor, CMOS for short) in the first photographing unit and the second photographing unit, and then transmits these image signals to an image signal processor (English: Image Signal Processor, ISP for short) for preprocessing, so as to obtain the first image and the second image.

Optionally, the electronic device used to photograph the first image and the second image and an electronic device used to execute a step indicated by a reference numeral 102 may be different electronic devices. For example, the electronic device used to photograph the first image and the second image is a mobile phone, a tablet computer, or a single lens reflex camera, and a process of photographing is the same as that described above. The electronic device that executes the step indicated by the reference numeral 102 is a laptop computer, another mobile phone, or another tablet computer. After being obtained by means of photographing, the first image and the second image are transmitted to the laptop computer, the another mobile phone, or the another tablet computer. Therefore, for the laptop computer, the another mobile phone, or the another tablet computer, the first image and the second image are obtained.

Next, the step indicated by the reference numeral 102 is introduced: Determine, according to a first image and a second image, whether a first photographing unit and a second photographing unit are normal.

In a first possible implementation manner, the step indicated by the reference numeral 102 specifically includes: determining, according to an offset between the first image and the second image and/or a similarity between the first image and the second image, whether the first photographing unit and the second photographing unit are normal.

Specifically, the similarity between the first image and the second image may be obtained by performing the following step: Obtain an image mean difference between the first image and the second image and/or an image variance difference between the first image and the second image, and use the image mean difference and/or the image variance difference as the similarity.

For example, an image mean of each image may be calculated by using a formula:

$$\text{mean} = \sum_{i,j} I_{i,j} / (imageWidth \times imageHeight),$$

where mean indicates the image mean, $I_{i,j}$ indicates coordinate values of pixels on the image, and i and j are positive integers; imageWidth indicates a width of the image, and imageHeight indicates a height of the image. By using the foregoing formula, first image mean of the first image and second image mean of the second image are obtained.

Optionally, an image variance of each image may also be calculated by using a formula:

$$\text{contrast} = \sum_{i,j} (I_{i,j} - \text{mean}) \times (I_{i,j} - \text{mean}) / (imageWidth \times imageHeight),$$

where contrast indicates the image variance. By using the foregoing formula, a first image variance of the first image and a second image variance of the second image are obtained.

When a difference between the first image mean and the second image mean, that is, the image mean difference between the first image and the second image, is greater than a first threshold, it is determined that the first photographing unit and the second photographing unit are abnormal. When a difference between the first image variance and the second image variance, that is, the image variance difference between the first image and the second image, is greater than a second threshold, it is determined that the first photographing unit and the second photographing unit are abnormal. Alternatively, when the image mean difference is greater than a first threshold, and the image variance difference is greater than a second threshold, it is determined that the first photographing unit and the second photographing unit are abnormal.

Specifically, the offset between the first image and the second image may be obtained by the following steps: Obtain a first projective histogram of the first image in a vertical direction and a second projective histogram of the first image in a horizontal direction; obtain a third projective histogram of the second image in the vertical direction and a fourth projective histogram of the second image in the horizontal direction; and determine that a first offset and a second offset are used as the offset. When the first projective histogram is shifted by the first offset in the vertical direction, the first projective histogram and the third projective histogram match well; and when the second projective histogram is shifted by the second offset in the horizontal direction, the second projective histogram and the fourth projective histogram match well. Content of acquiring the projective histogram is well-known by a person skilled in the art, and therefore details are not described herein.

Optionally, the first offset may be determined by using a formula:

$$verHistoDiff[\text{offset}] = \underset{\text{offset}}{\text{argmin}} \frac{\sum_{j} \text{abs}(leftVerHisto\lfloor j + \text{offset}\rfloor - rightVerHisto\lfloor j \rfloor)}{\text{overlapping bin number}}.$$

Optionally, the second offset may be determined by using a formula:

$$horHistoDiff[\text{offset}] = \underset{\text{offset}}{\text{argmin}} \frac{\sum_{j} \text{abs}(leftHorHisto\lfloor j + \text{offset}\rfloor - rightHorHisto\lfloor j \rfloor)}{\text{overlapping bin number}},$$

where in the foregoing two formulas, verHistoDiff[offset] indicates the first offset. On the right side of equal signs of the two formulas, offset indicates an experimental offset; leftVerHisto indicates the first projective histogram; right-VerHisto indicates the third projective histogram; and j indicates a quantity of bins (bin) of a histogram, and if the quantity of bins of a histogram is N, a value of j ranges from 1 to N, where N is a positive integer. overlapping bin number in the first formula indicates a quantity of overlapping bins between the first projective histogram and the third projective histogram after the first projective histogram is shifted in bins by a quantity of offset. horHistoDiff [offset] indicates the second offset, leftHorHisto indicates the second projective histogram, and rightHorHisto indicates the fourth projective histogram. overlapping bin number in the second formula indicates a quantity of overlapping bins between the second projective histogram and the fourth projective histogram after the second projective histogram is shifted in bins by a quantity of the offset. The foregoing two formulas indicate that different experimental offsets are used to substitute into fractions on the right side of equations to calculate values of the fractions. During multiple experiments, an experimental offset that is corresponding to a minimum value of the fractions is a first offset or a second offset that is required by the left side of the equations. After one of the two projective histograms is shifted by the experimental offset that is corresponding to the minimum value of the fraction, the matching effect of the two projective histograms, compared with another experimental offset, is the best.

When the first offset is greater than a third threshold, it is determined that the first photographing unit and the second photographing unit are abnormal. When the second offset is greater than a fourth threshold, it is determined that the first photographing unit and the second photographing unit are abnormal. Alternatively, when the first offset is greater than the third threshold, and the second offset is greater than the fourth threshold, it is determined that the first photographing unit and the second photographing unit are abnormal.

In practical use, whether the first photographing unit and the second photographing unit are normal may be determined by using only the similarity; whether the first photographing unit and the second photographing unit are normal may be determined by using only the offset; whether the first photographing unit and the second photographing unit are normal may be determined by using both the similarity and the offset: when both the similarity and the offset meet conditions, it is determined that the first photographing unit and the second photographing unit are normal; or whether the first photographing unit and the second photographing unit are normal may be determined by first determining the similarity; and when the similarity does not meet a condition, for example, the image mean difference between the first image and the second image is less than the first threshold, whether the first photographing unit and the second photographing unit are normal may be determined by using only the offset.

In a second possible implementation manner, the step indicated by the reference numeral 102 includes: obtaining an offset between the first image and the second image; shifting the first image according to the offset; separately dividing the shifted first image and the second image into n*m block regions, where n and m are both positive integers greater than 1; determining a case in which block regions on corresponding positions on the shifted first image and the second image do not match each other; and determining, based on the case of mutual mismatch, whether the first photographing unit and the second photographing unit are normal.

For a specific implementation manner for obtaining the offset between the first image and the second image, reference may be made to the foregoing description, for example, obtaining the first offset and the second offset.

The first image is shifted according to the offset. For example, the first image is shifted in a vertical direction according to the first offset, and the first image is shifted in a horizontal direction according to the second offset.

Next, the shifted first image and the second image are separately divided into n*m block regions. For example, refer to FIG. 3; a first image 301 and a second image 302 are both divided into 10*12 block regions 303.

Then a case in which block regions on corresponding positions on the shifted first image and the second image do not match each other is determined. Specifically, whether the block regions on the corresponding positions match may be determined according to an average luminance difference of the block regions on the corresponding positions. For example, when the average luminance difference of the block regions on the corresponding region is greater than a given threshold, it may be determined that the two block regions on the corresponding positions do not match. For example, still refer to FIG. 3; an average luminance of a first block region 3031 on the first image 301 is calculated. An average luminance of a second block region 3032 on the second image 302 is calculated, where a position of the first block region 3031 is corresponding to a position of the second block region 3032. Then, an average luminance difference between the first block region 3031 and the second block region 3032 is determined. Then whether the difference of the average luminance is greater than the given threshold is determined. If the average luminance difference is greater than the given threshold, it is determined that the first block region 3031 and the second block region 3032 do not match; or if the average luminance difference is not greater than the give threshold, it is determined that the first block region 3031 and the second block region 3032 match each other.

Figure 3:
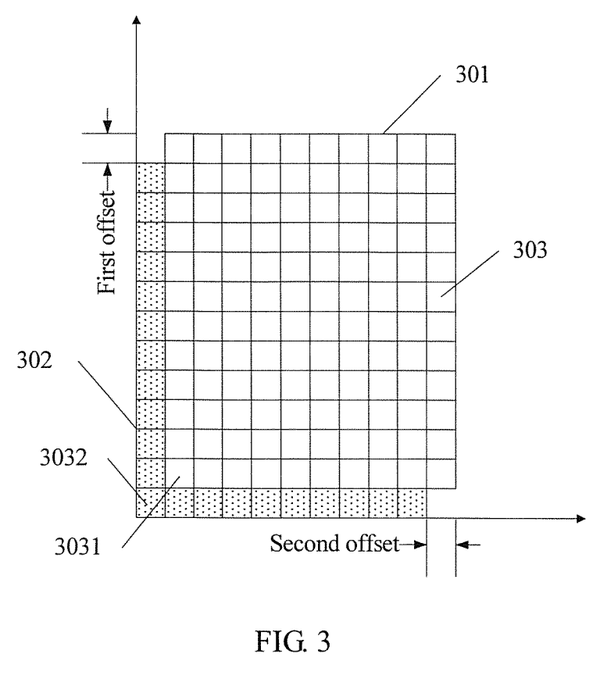
FIG. 3 is a schematic diagram of a projective histogram that is divided according to an embodiment of this application.

In practical use, the case of mutual mismatch may be positions of mismatched block regions, or may be a proportion of the block regions that do not match each. For details, refer to the following specific implementation manners.

Whether the first photographing unit and the second photographing unit are normal is determined based on the case of mutual mismatch. Specifically, when the proportion of the block regions that do not match each other is greater than the first threshold, it may be determined that the first photographing unit and the second photographing unit are abnormal; or if the proportion of the block regions that do not match each other is not greater than the first threshold, it is determined that the first photographing unit and the second photographing unit are normal.

Further, whether the first photographing unit and the second photographing unit are normal may be determined based on the case of mutual mismatch and the offset. Specifically, when the offset is greater than the second threshold, and a proportion of the block regions that do not match each other is less than the third threshold, it is determined that a relationship between relative positions of the first photographing unit and the second photographing unit is abnormal. The third threshold may be set to a different value according to a scenario of close photographing or distant photographing. For example, if focal lengths of the two photographing units are greater than a preset value, the scenario is regarded as the distant photographing. If the focal lengths are less than the preset value, the scenario is regarded as the close photographing. Because when the close photographing is performed, a parallax between the two photographing units is bigger and the proportion of mismatch is greater, and in this case, the third threshold may be set to a larger value. However, when the distant photographing is performed, the proportion of the blocks regions that do not match is low, and in this case, the third threshold may be set to a smaller value. The offset is greater than the second threshold; specifically, for example, the first offset is greater than the third threshold, and in this case, the first offset is the offset, and the third threshold is the second threshold. For another example, the second offset is greater than a fourth threshold, and in this case, the second offset is, that is, the offset, the fourth threshold is, that is, the second threshold. For another example, if both the first offset and the second offset are taken into consideration, the second threshold includes the third threshold and the fourth threshold.

That is, by using the method in this embodiment, it may further be determined that a relationship between relative positions of the photographing units is abnormal, so that a user can quickly learn a cause of the abnormality and perform adjustment.

Optionally, when it is determined that the relationship between the relative positions of the first photographing unit and the second photographing unit is abnormal, calibration may be performed. For example, an internal parameter and an external parameter of the two photographing units are calibrated, where the internal parameter is specifically, for example, a parameter of a lens of the photographing unit, and the external parameter is specifically, for example, a deviation angle of an optical axis. Content of this part is well-known by a person skilled in the art, and therefore details are not described herein.

Further, when positions of block regions that are consecutively mismatched are the same, it may be determined that a lens of at least one of the first photographing unit and the second photographing unit has a blurry area. For example, still refer to FIG. 3. It is assumed that the steps that are indicated by the reference numeral 101 and the reference numeral 102 are consecutively executed multiple times, and matching results that are indicated by the step indicated by the reference numeral 102 all indicate that the first block region 3031 and the second block region 3032 do not match. This indicates that there is a blurry area on a position that is of a first lens and that is corresponding to the first block region 3031 or at a position that is of a second lens and that is corresponding to the second block region 3032. Further, a user may be informed that there is a blurry area on the lens, so that the user may quickly eliminate the abnormality.

Further, whether the first photographing unit and the second photographing unit are normal may be determined based on the case of mutual mismatch and the similarity. For a method for obtaining the similarity, refer to the foregoing description. For example, when the similarity is greater than a given threshold, and the proportion of the block regions that do not match each other is greater than the first threshold, it is determined that the first photographing unit and the second photographing unit are abnormal. For another example, when the image mean difference is greater than a first threshold and/or the image variance difference is greater than a second threshold, and a proportion of the block regions, on the corresponding positions, that do not match each other is greater than the first threshold, it is determined that a lens of at least one of the first photographing unit and the second photographing unit is blocked. In this case, a user may be informed that the lens is blocked, so that the user may quickly eliminate the abnormality. For another example, when the similarity does not meet a condition, whether the first photographing unit and the second photographing unit are normal is determined according to the case of mutual mismatch.

Further, whether the first photographing unit and the second photographing unit are normal may be determined based on the similarity, the offset, and the case of mismatch. Specifically, for example, when the similarity, the offset, and the case of mismatch all meet conditions, it is determined that the first photographing unit and the second photographing unit are normal.

Figure 4:
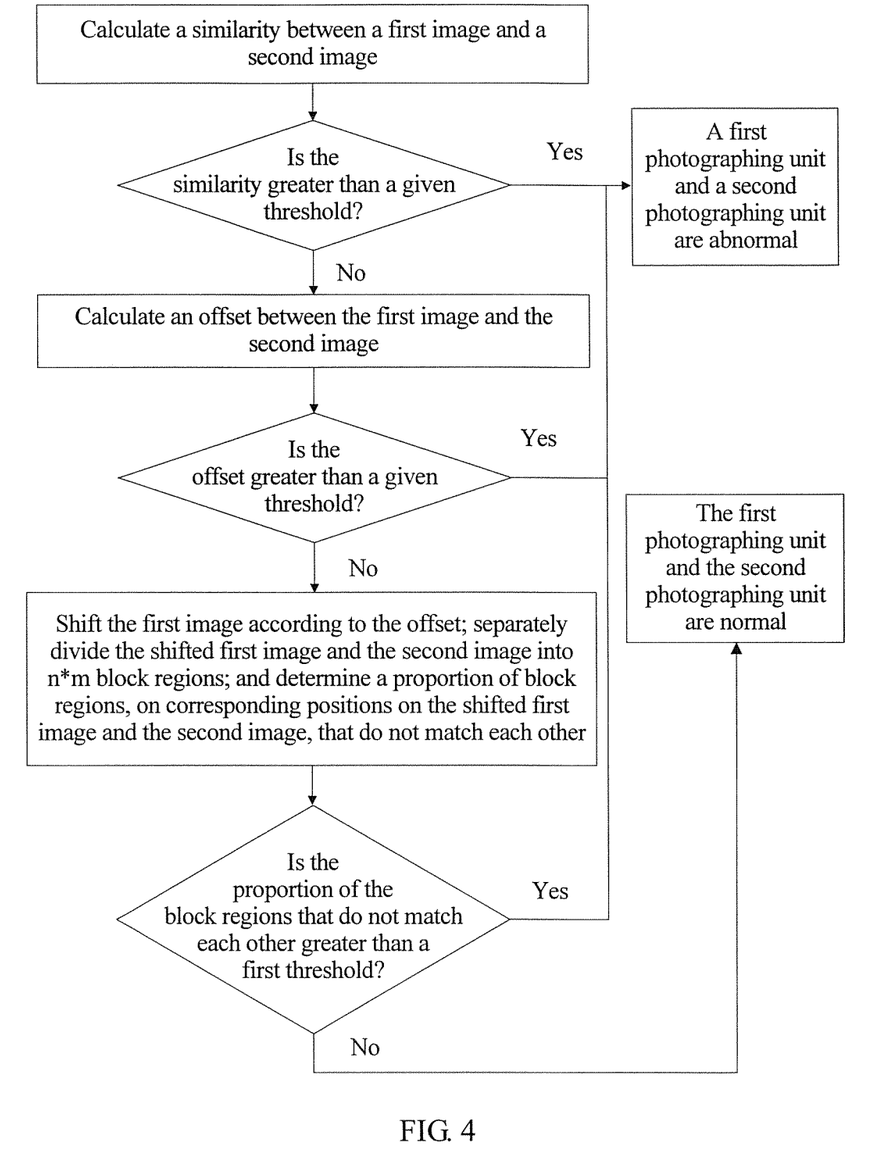
FIG. 4 is a diagram of an example of an image processing method according to an embodiment of this application.

A third possible implementation manner: The step indicated by the reference numeral 102 includes: determining, based on the similarity, the offset, and the case of mismatch, whether the first photographing unit and the second photographing unit are normal. For example, refer to FIG. 4; a similarity between the first image and the second image is calculated; whether the similarity is greater than a given threshold is determined; if the similarity is greater than the given threshold, it is determined that the first photographing unit and the second photographing unit are abnormal; or if the similarity is not greater than the given threshold, an offset between the first image and the second image is calculated; whether the offset is greater than a given threshold is determined; if the offset is greater than the given threshold, it is determined that the first photographing unit and the second photographing unit are abnormal; or if the offset is not greater than the given threshold, the first image is shifted according to the offset, and the shifted first image and the second image are separately divided into n*m block regions; a proportion of block regions, on corresponding positions on the shifted first image and the second image, that do not match each other is determined; and whether the proportion of the block regions that do not match each other is greater than a first threshold is determined; if the proportion of the block regions that do not match each other is greater than the first threshold, it is determined that the first photographing unit and the second photographing unit are abnormal; or if the proportion of the block regions that do not match each other is not greater than the first threshold, it is determined that the first photographing unit and the second photographing unit are normal.

The following provides an example of a specific application scenario in which that the photographing unit is normal needs to be determined.

To obtain a better photographing effect, a multi-frame photographing algorithm is used in the prior art to optimize the photographing effect. For example, a high dynamic range (English: high dynamic range, HDR for short) algorithm is: acquiring multiple frames of images by setting different exposures, processing the multiple frames of images by using the algorithm, and generating an image with a larger dynamic range. An HDR image provides a wider dynamic range and more image details, and can better reflect a visual effect in a real environment.

Figure 5:
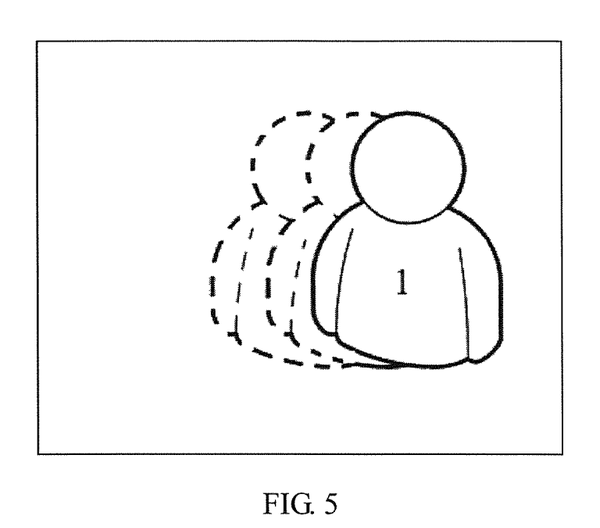
FIG. 5 is a schematic diagram of "ghosting" in the prior art.

An HDR technology requires that multiple frames of images are acquired in a same scenario by using one photographing unit at different moments, so that there is a certain time interval between the multiple frames of images. At the time interval, affected by movement of an electronic device or movement of an object in the scenario, for example, a hand trembles, the wind blows branches of a tree, or a person walks around, positions of a same object on multiple frames of images may be changed, for example, when a person 1 quickly moves, positions of the person 1 are different on multiple frames of images with different exposures and are distributed along a movement track of the person 1, an image fusion of the multiple frames of images is performed to generate an HDR image. As shown in FIG. 5, what is indicated by a dashed line is referred to as "ghosting" of the person 1, which affects the photographing effect.

To resolve the described problem of "ghosting", this embodiment of this application provides a method: two frames of images in the two acquisition regions that have an overlapping acquisition region are acquired by the first photographing unit and the second photographing unit at a same acquisition moment, and then the two frames of images are synthesized to form an HDR image. In this method, because the two frames of images are respectively acquired by the two photographing units at the same time, the problem of "ghosting" in the prior art that is caused by acquiring two frames of images by one photographing unit at different moments may be rectified. The first photographing unit and the second photographing unit may be located on a same side of an electronic device.

However, in this method, the two photographing units are configured to acquire images at the same time. If the two photographing units are abnormal, for example, a lens of one of the photographing units is blocked, or there is a blurry area on a lens, or optical axes of the two photographing units are inconsistent, an effect of a synthesized HDR image is relatively poor.

Therefore, whether the two photographing units are normal may be determined by using the method described in this embodiment of this application.

When it is determined that the first photographing unit and the second photographing unit are normal, perform the following step: Synthesize two frames of images in the two acquisition regions that have an overlapping acquisition region and that are acquired by the first photographing unit and the second photographing unit at the same acquisition moment to form an HDR image, so as to obtain a better photographing effect.

Optionally, when it is determined that the first photographing unit and the second photographing unit are abnormal, as described in the foregoing, the multiple frames of images that are photographed by one photographing unit at different moments are synthesized to form an HDR image. Optionally, the one photographing unit may be specifically a photographing unit that can display a preview image on a monitor of an electronic device.

It may be learned from the foregoing description that, in this embodiment of this application, before the synthesizing two frames of images in the two acquisition regions that have an overlapping acquisition region and that are acquired by the first photographing unit and the second photographing unit at the same acquisition moment to form an HDR image, it is first determined that the two photographing units are normal. Therefore, the problem that the effect of the synthesized HDR image is poor and that is caused by the abnormality of the two photographing units may be avoided.

Optionally, before the step indicated by the reference numeral 102, the method further includes: determining that a current scenario is an HDR scenario. In the HDR scenario, because multiple frames of images are required to form an HDR image, whether the first photographing unit and the second photographing unit are normal needs to be determined.

Specifically, whether the current scenario is the HDR scenario may be determined in multiple manners. For example, after a user sets a current scenario, an electronic device may determine the current scenario by querying a value that is set. For another example, when the electronic device detects a night scenario or a low luminance scenario, it is determined that the HDR scenario needs to be entered under the present circumstance.

Optionally, when it is determined that the first photographing unit and the second photographing unit are normal, the method further includes: separately calculating depth information of each object in the first image and the second image; and determining that a quantity of objects whose depth information is greater than a threshold exceeds a preset value. For example, when most of the objects are distant from the photographing units, two frames of images in the two acquisition regions that have an overlapping acquisition region and that are acquired by the first photographing unit and the second photographing unit at the same acquisition moment are synthesized to form an HDR image; or when most of the objects are not distant from the photographing units, multiple frames of images that are acquired by one photographing unit at different moments are synthesized to form an HDR image. Because if close photographing is performed, there is a bigger difference between images that are acquired by the two photographing units, and in this case, an effect of the synthesized HDR image is relatively poor. Under this circumstance, an effect of an HDR image that is formed by synthesizing multiple frames of images that are acquired by one photographing unit at different moments is better. Therefore, whether a current scenario is distant photographing may be determined by using the method provided in this embodiment; when the current scenario is distant photographing, two frames of images in the two acquisition regions that have an overlapping acquisition region and that are acquired by the first photographing unit and the second photographing unit at the same acquisition moment may be synthesized to form an HDR image, so as to obtain a better photographing effect.

Figure 6:
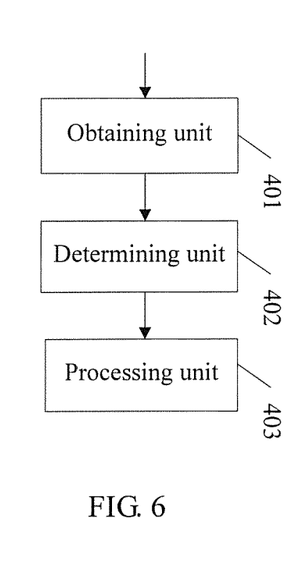
FIG. 6 is a functional block diagram of an image processing apparatus according to an embodiment of this application.

Based on a same inventive concept, an embodiment of this application further provides an image processing apparatus. Referring to FIG. 6, FIG. 6 is a block diagram of a function of the image processing apparatus. The apparatus includes: an obtaining unit 401, configured to obtain a first image and a second image that are acquired at a same acquisition moment, where the first image is obtained by using a first photographing unit to acquire an image in a first acquisition region, and the second image is obtained by using a second photographing unit to acquire an image in a second acquisition region, where a parameter of the first photographing unit and a parameter of the second photographing unit are the same, and there is an overlapping acquisition region between the first acquisition region and the second acquisition region; and a determining unit 402, configured to determine, according to the first image and the second image, whether the first photographing unit and the second photographing unit are normal. The parameters are the same; specifically, for example, the two photographing units have a same focal length. It may be understood that the first photographing unit and the second photographing unit may have a same focal length and a same image sensor; certainly, the first photographing unit and the second photographing unit may have a same lens and another same hardware parameter.

It should be noted that: that the first photographing unit and the second photographing unit have one same parameter may be understood that the parameter of the first photographing unit and the parameter of the second photographing unit are the same; certainly, that the first photographing unit and the second photographing unit have multiple same parameters (for example, two parameters or three parameters are the same) may also be understood that the parameter of the first photographing unit and the parameter of the second photographing unit are the same. Preferably, all the parameters of the first photographing unit and the second photographing unit are the same, that is, the first photographing unit and the second photographing unit are two same photographing units.

Optionally, the apparatus further includes a processing unit 403, configured to: when it is determined that the first photographing unit and the second photographing unit are normal, synthesize two frames of images in the two acquisition regions that have an overlapping acquisition region and that are acquired by the first photographing unit and the second photographing unit at the same acquisition moment to form a high dynamic range HDR image.

Optionally, the determining unit 402 is specifically configured to: obtain an offset between the first image and the second image; shift the first image according to the offset; separately divide the shifted first image and the second image into n*m block regions, where n and m are both positive integers greater than 1; determine a case in which block regions on corresponding positions on the shifted first image and the second image do not match each other; and determine, based on the case of mutual mismatch, whether the first photographing unit and the second photographing unit are normal.

Further, the determining unit 402 is further configured to: obtain a similarity between the first image and the second image; and determine, based on the case of mutual mismatch and the similarity, whether the first photographing unit and the second photographing unit are normal.

Further, the determining unit 402 is specifically configured to: obtain an image mean difference between the first image and the second image and/or an image variance difference between the first image and the second image, and use the image mean difference and/or the image variance difference as the similarity; and when the image mean difference is greater than a first threshold and/or the image variance difference is greater than a second threshold, and a proportion of the block regions, on the corresponding positions, that do not match each other is greater than the first threshold, determine that a lens of at least one of the first photographing unit and the second photographing unit is blocked.

Optionally, the determining unit 402 is further configured to: determine, based on the case of mutual mismatch and the offset, whether the first photographing unit and the second photographing unit are normal.

Further, the determining unit 402 is specifically configured to: when the offset is greater than a second threshold, and a proportion of the block regions that do not match each other is less than a third threshold, determine that a relationship between relative positions of the first photographing unit and the second photographing unit is abnormal.

Optionally, the determining unit 402 is further configured to: calculate the similarity between the first image and the second image; and determine, based on the similarity, the offset, and the case of mismatch, whether the first photographing unit and the second photographing unit are normal.

Optionally, the determining unit 402 is specifically configured to: when positions of block regions that are consecutively mismatched are the same, determine there is a blurry area on a lens of at least one of the first photographing unit and the second photographing unit is blocked.

Optionally, the determining unit 402 is specifically configured to: determine, according to the offset between the first image and the second image and/or the similarity between the first image and the second image, whether the first photographing unit and the second photographing unit are normal.

With reference to the foregoing embodiments, the determining unit 402 is further configured to: before the determining, according to the first image and the second image, whether the first photographing unit and the second photographing unit are normal, determine that a current scenario in which the first photographing unit and the second photographing unit are is an HDR scenario.

With reference to the foregoing embodiments, the determining unit 402 is further configured to: when it is determined that the first photographing unit and the second photographing unit are normal, separately calculate depth information of each object in the first image and the second image; and determine that a quantity of objects whose depth information is greater than a threshold exceeds a preset value.

Variations and specific examples of the image processing method in the foregoing embodiments in FIG. 1 to FIG. 4 are also applicable to the image processing apparatus in this embodiment. With the foregoing detailed descriptions of the image processing method, a person skilled in the art may clearly understand the implementation manner of the image processing apparatus in this embodiment. Therefore, for brevity of the specification, details are not described herein.

Figure 7:
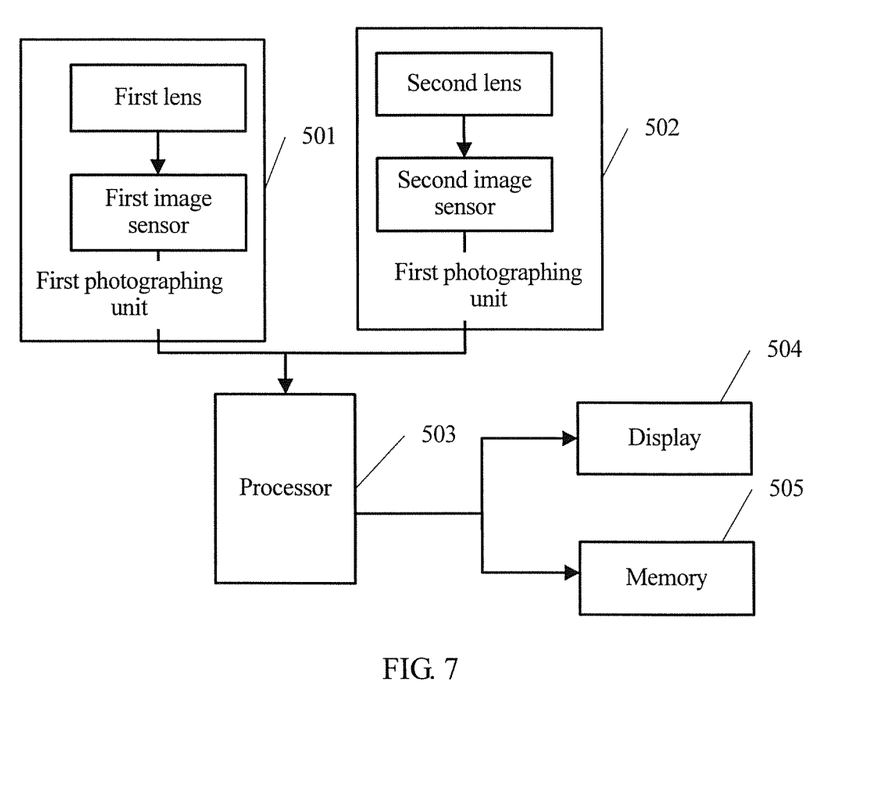
FIG. 7 is block diagram of a system of an electronic device according to an embodiment of this application.

Based on a same inventive concept, an embodiment of this application further provides an electronic device. Referring to FIG. 7, FIG. 7 is a block diagram of a system of the electronic device according to this embodiment. The electronic device includes: a first photographing unit 501, configured to acquire an image in a first acquisition region so as to obtain a first image; a second photographing unit 502, configured to acquire, at the same acquisition moment at which the first image is acquired, an image in a second acquisition region so as to obtain a second image; a parameter of the first photographing unit 501 and a parameter of the second photographing unit 502 are the same, and there is an overlapping acquisition region between the first acquisition region and the second acquisition region; and a processor 503, configured to determine, according to the first image and the second image, whether the first photographing unit 501 and the second photographing unit 502 are normal.

Specifically, the first photographing unit 501 includes a first lens and a first image sensor. The first image sensor, for example, is a charge-coupled device (English: Charge-coupled Device, CCD for short) or a complementary metal oxide semiconductor (English: Complementary Metal Oxide Semiconductor, CMOS for short). The second photographing unit 502 includes a second lens and a second image sensor.

Optionally, the processor 503 is further configured to: when it is determined that the first photographing unit 501 and the second photographing unit 502 are normal, synthesize two frames of images in the two acquisition regions that have an overlapping acquisition region and that are acquired by the first photographing unit 501 and the second photographing unit 502 at the same acquisition moment to form a high dynamic range HDR image.

Optionally, the processor 503 is specifically configured to: obtain the offset between the first image and the second image; shift the first image according to the offset; separately divide the shifted first image and the second image into n*m block regions, where n and m are both positive integers greater than 1; determine a case in which block regions on corresponding positions on the shifted first image and the second image do not match each other; and determine, based on the case of mutual mismatch, whether the first photographing unit 501 and the second photographing unit 502 are normal.

Optionally, the processor 503 is further configured to: obtain a similarity between the first image and the second image; and determine, based on the case of mutual mismatch and the similarity, whether the first photographing unit 501 and the second photographing unit 502 are normal.

Further, the processor 503 is specifically configured to: obtain an image mean difference between the first image and the second image and/or an image variance difference between the first image and the second image, and use the image mean difference and/or the image variance difference as the similarity; and when the image mean difference is greater than a first threshold and/or the image variance difference is greater than a second threshold, and a proportion of the block regions, on the corresponding positions, that do not match each other is greater than the first threshold, determine that a lens of at least one of the first photographing unit 501 and the second photographing unit 502 is blocked.

Optionally, the processor 503 is specifically configured to: determine, based on the case of mutual mismatch and the offset, whether the first photographing unit 501 and the second photographing unit 502 are normal.

Further, the processor 503 is specifically configured to: when the offset is greater than a second threshold, and a proportion of the block regions that do not match each other is less than a third threshold, determine that a relationship between relative positions of the first photographing unit 501 and the second photographing unit 502 is abnormal.

Optionally, the processor 503 is further configured to: calculate the similarity between the first image and the second image; and determine, based on the similarity, the offset, and the case of mismatch, whether the first photographing unit 501 and the second photographing unit 502 are normal.

Optionally, the processor 503 is specifically configured to: when positions of block regions that are consecutively mismatched are the same, determine that there is a blurry area on one of lens of the first photographing unit 501 or the second photographing unit 502.

Optionally, the processor 503 is specifically configured to: determine, according to the offset between the first image and the second image and/or the similarity between the first image and the second image, whether the first photographing unit 501 and the second photographing unit 502 are normal.

With reference to the foregoing embodiments, the processor 503 is further configured to: before the determining, according to the first image and the second image, whether the first photographing unit 501 and the second photographing unit 502 are normal, determine that a current scenario in which the first photographing unit 501 and the second photographing unit 502 are is an HDR scenario.

With reference to the foregoing embodiments, the processor 503 is further configured to: when it is determined that the first photographing unit 501 and the second photographing unit 502 are normal, separately calculate depth information of each object in the first image and the second image; and determine that a quantity of objects whose depth information is greater than a threshold exceeds a preset value.

Still refer to FIG. 7; the electronic device further includes a monitor 504, configured to display an image obtained by the first photographing unit 501 and/or the second photographing unit 502 or the processor 503.

Optionally, the electronic device further includes a memory 505, configured to store data that is used by the processor 503 when an operation is executed; or store temporary image data that is acquired by the first photographing unit 501 and/or the second photographing unit 502.

Optionally, the processor 503 may specifically include: a central processing unit (CPU) and an IPS.

Optionally, the processor 503 is a CPU, and the processor 503 and an IPS are chips that are physically independent of each other.

Optionally, the electronic device further includes a battery, configured to charge the electronic device.

Variations and specific examples of the image processing method in the foregoing embodiments in FIG. 1 to FIG. 4 are also applicable to the image processing apparatus in this embodiment. With the foregoing detailed descriptions of the image processing method, a person skilled in the art may clearly understand the implementation manner of the image processing apparatus in this embodiment. Therefore, for brevity of the specification, details are not described herein.

One or more technical solutions provided in the embodiments of this application have at least the following technical effects or advantages:

In the embodiments of this application, whether a first photographing unit and a second photographing unit are normal is determined according to a first image and a second image, where the first image is obtained by using the first photographing unit to acquire an image in a first acquisition region and the second image is obtained by using the second photographing unit to acquire an image in a second acquisition region; there is an overlapping acquisition region between the first acquisition region and the second acquisition region. It may be learned that, in the embodiments of this application, an electronic device may determine, according to the images photographed by two photographing units, whether the two photographing units are normal. That is, the embodiments of this application provide a method for determining whether the photographing unit is normal, so as to photograph an image under the circumstance that both the photographing units are normal, and guarantee a photographing effect.

It should be understood, by a person skilled in the art, that the method and the device that are provided in the embodiments of this application may be implemented by using hardware or a combination of software and hardware.

This application is described with reference to the flowcharts or block diagrams of the method, the device (system), and the computer program product according to the embodiments of this application. It should be understood that computer program instructions may be used to implement each process or each block in the flowcharts or the block diagrams and a combination of a process or a block in the flowcharts or the block diagrams. These computer program instructions may be provided for a general-purpose computer, a dedicated computer, an embedded processor, or a processor of any other programmable data processing device, so that the instructions executed by a computer or a processor of any other programmable data processing device generate an apparatus for implementing a specified function in one or more processes in the flowcharts or in one or more blocks in the block diagrams.

These computer program instructions may be stored in a readable memory that can instruct the computer or any other programmable data processing device, so that the instructions stored in the computer readable memory generate an artifact that includes an instruction apparatus. The instruction apparatus implements a specified function in one or more processes in the flowcharts or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An image processing method, comprising:
obtaining a first image and a second image that are acquired at a same acquisition moment, wherein the first image is obtained by using a first photographing unit to acquire an image in a first acquisition region, and the second image is obtained by using a second photographing unit to acquire an image in a second acquisition region, wherein a parameter of the first photographing unit and a parameter of the second photographing unit are the same, and there is an overlapping acquisition region between the first acquisition region and the second acquisition region; and
determining, according to at least one of a difference of mean of a pixel value or a difference of variance of a pixel value between the first image and the second image and according to whether at least a proportion of the overlapping region of first acquisition region does not match the overlapping region of the second acquisition region, whether the first photographing unit and the second photographing unit are normal,
wherein determining, according to the first image and the second image, whether the first photographing unit and the second photographing unit are normal comprises:
obtaining an offset between the first image and the second image;
shifting the first image according to the offset;
separately dividing the shifted first image and the second image into n*m block regions, wherein n and m are both positive integers greater than 1;
determining block regions on corresponding positions on the shifted first image and the second image, wherein the block regions do not match each other; and
determining whether the first photographing unit and the second photographing unit are normal according to the case of mutual mismatch.

2. The method according to claim 1, wherein when it is determined that the first photographing unit and the second photographing unit are normal, two frames of images in the two acquisition regions that have an overlapping acquisition region and that are acquired by the first photographing unit and the second photographing unit at the same acquisition moment are synthesized to form a high dynamic range (HDR) image.

3. The method according to claim 1, comprising:
obtaining a similarity between the first image and the second image; and
determining whether the first photographing unit and the second photographing unit are normal according to the case of mutual mismatch comprises:
determining whether the first photographing unit and the second photographing unit are normal according to the similarity and the case of mutual mismatch.

4. The method according to claim 3, wherein obtaining a similarity between the first image and the second image comprises:
obtaining at least one of the difference of mean of the pixel value between the first image and the second image or the difference of variance of the pixel value between the first image and the second image, and using the at least one of the difference of mean of the pixel value or the difference of variance of the pixel value as the similarity; and
determining whether the first photographing unit and the second photographing unit are normal according to the case of mutual mismatch and the similarity comprises:
when at least one of the image mean difference is greater than a first threshold or the image variance difference is greater than a second threshold, and a proportion of the block regions, on the corresponding positions, that do not match each other is greater than the first threshold, determining that a lens of at least one of the first photographing unit or the second photographing unit is blocked.

5. The method according to claim 1, wherein determining whether the first photographing unit and the second photographing unit are normal when the block regions do not match each other comprises:
determining whether the first photographing unit and the second photographing unit are normal according to the offset and the case of mutual mismatch.

6. The method according to claim 5, wherein determining whether the first photographing unit and the second photographing unit are normal according to the case of mutual mismatch and the offset comprises:
when the offset is greater than a second threshold, and a proportion of the block regions that do not match each other is less than a third threshold, determining that a relationship between relative positions of the first photographing unit and the second photographing unit is abnormal.

7. The method according to claim 1, further comprising:
calculating a similarity between the first image and the second image; and
determining whether the first photographing unit and the second photographing unit are normal according to the case of mutual mismatch comprises:
determining whether the first photographing unit and the second photographing unit are normal according to the similarity, the offset, and the case of mismatch.

8. The method according to claim 1, wherein determining whether the first photographing unit and the second photographing unit are normal according to the case of mutual mismatch comprises:
when positions of block regions that are consecutively mismatched are the same, determining that a lens of at least one of the first photographing unit or the second photographing unit has a blurry area.

9. The method according to claim 1, wherein determining, according to the first image and the second image, whether the first photographing unit and the second photographing unit are normal comprises:
determining, according to at least one of the offset between the first image and the second image or the similarity between the first image and the second image, whether the first photographing unit and the second photographing unit are normal.

10. An electronic device, comprising:
a first photographing unit, configured to acquire an image in a first acquisition region so as to obtain a first image;
a second photographing unit, configured to acquire, at the same acquisition moment at which the first image is acquired, an image in a second acquisition region so as to obtain a second image, wherein a parameter of the first photographing unit and a parameter of the second photographing unit are the same, and there is an overlapping acquisition region between the first acquisition region and the second acquisition region; and
a processor, configured to determine, according to at least one of a difference of mean of a pixel value or a difference of variance of a pixel value between the first image and the second image and according to whether at least a proportion of the overlapping region of first acquisition region does not match the overlapping region of the second acquisition region, whether the first photographing unit and the second photographing unit are normal,
wherein the processor is configured to:
obtain an offset between the first image and the second image;
shift the first image according to the offset;
separately divide the shifted first image and the second image into n*m block regions, wherein n and m are positive integers greater than 1;
determine block regions on corresponding positions on the shifted first image and the second image, wherein the block regions do not match each other; and
determine whether the first photographing unit and the second photographing unit are normal according to the case of mutual mismatch.

11. The electronic device according to claim 10, wherein the processor is further configured to:
when it is determined that the first photographing unit and the second photographing unit are normal, synthesize two frames of images in the two acquisition regions that have an overlapping acquisition region and that are acquired by the first photographing unit and the second photographing unit at the same acquisition moment to form a high dynamic range (HDR) image.

12. The electronic device according to claim 10, wherein the processor is further configured to:
obtain a similarity between the first image and the second image; and
determine whether the first photographing unit and the second photographing unit are normal according to the similarity and the case of mutual mismatch.

13. The electronic device according to claim 12, wherein the processor is configured to:
obtain at least one of the difference of mean of the pixel value between the first image and the second image or the difference of variance of the pixel value between the first image and the second image, and use the at least one of the image mean difference or the image variance difference as the similarity; and
when at least one of the difference of mean of the pixel value is greater than a first threshold or the difference of variance of the pixel value is greater than a second threshold, and a proportion of the block regions, on the corresponding positions, that do not match each other is greater than the first threshold, determine that a lens of at least one of the first photographing unit or the second photographing unit is blocked.

14. The electronic device according to claim 10, wherein the processor is configured to:
determine whether the first photographing unit and the second photographing unit are normal according to the offset and the case of mutual mismatch.

15. The electronic device according to claim 14, wherein the processor is configured to:
when the offset is greater than a second threshold and a proportion of the block regions that do not match each other is less than a third threshold, determine that a relationship between relative positions of the first photographing unit and the second photographing unit is abnormal.

16. The electronic device according to claim 10, wherein the processor is further configured to:
calculate a similarity between the first image and the second image; and determine whether the first photographing unit and the second photographing unit are normal according to the similarity, the offset, and the case of mismatch.

17. The electronic device according to claim 10, wherein the processor is configured to:
when positions of block regions that are consecutively mismatched are the same, determine that a lens of at least one of the first photographing unit or the second photographing unit has a blurry area.

18. The electronic device according to claim 10, wherein the processor is configured to:
determine, according to at least one of the offset between the first image and the second image or the similarity between the first image and the second image, whether the first photographing unit and the second photographing unit are normal.

* * * * *